United States Patent [19]

Ho et al.

[11] Patent Number: 6,081,143

[45] Date of Patent: Jun. 27, 2000

[54] FREQUENCY COMPARISON AND GENERATION IN AN INTEGRATED PROCESSOR

[75] Inventors: Kenneth S. Ho, Cupertino; Anup K. Sharma, Sunnyvale, both of Calif.

[73] Assignee: Sun Microsystems, Inc., Palo Alto, Calif.

[21] Appl. No.: 08/938,530

[22] Filed: Sep. 26, 1997

[51] Int. Cl.[7] ..................................... H03K 5/01
[52] U.S. Cl. .............................. 327/166; 327/42; 327/46; 331/11
[58] Field of Search ..................... 327/156, 146, 327/155, 141, 147, 17, 12, 117, 165, 166, 39, 40, 42, 44, 46; 331/10, 11, DIG. 2; 375/373–376

[56] References Cited

U.S. PATENT DOCUMENTS

| | | | |
|---|---|---|---|
| 4,743,864 | 5/1988 | Nakagawa | 331/1 A |
| 4,745,371 | 5/1988 | Haine | 331/1 A |
| 4,812,783 | 3/1989 | Honjo | 331/20 |
| 5,061,882 | 10/1991 | Takagi | 318/116 |
| 5,202,906 | 4/1993 | Saito | 331/14 |
| 5,714,896 | 2/1998 | Nakagawa | 327/115 |

*Primary Examiner*—Timothy P. Callahan
*Assistant Examiner*—Minh Nguyen
*Attorney, Agent, or Firm*—Conley, Rose & Tayon, PC; B. Noel Kivlin

[57] ABSTRACT

An integrated processor includes a microprocessor core and a bus interface unit. The integrated processor receives a reference clock signal and an external clock signal. The frequency of the reference clock signal is compared to the frequency of the external clock signal. Based upon this comparison, the appropriate frequency for the internal clock signal that controls the bus interface unit is determined. A clock generation circuit, such as a phase-locked loop, generates the appropriate frequency for the internal clock signal based upon the comparison of the reference clock signal and external clock signal.

19 Claims, 7 Drawing Sheets

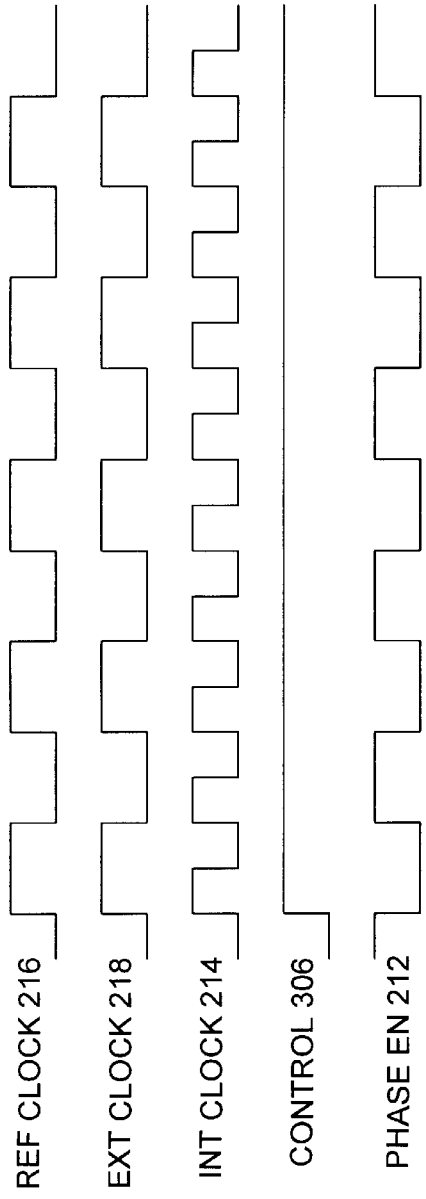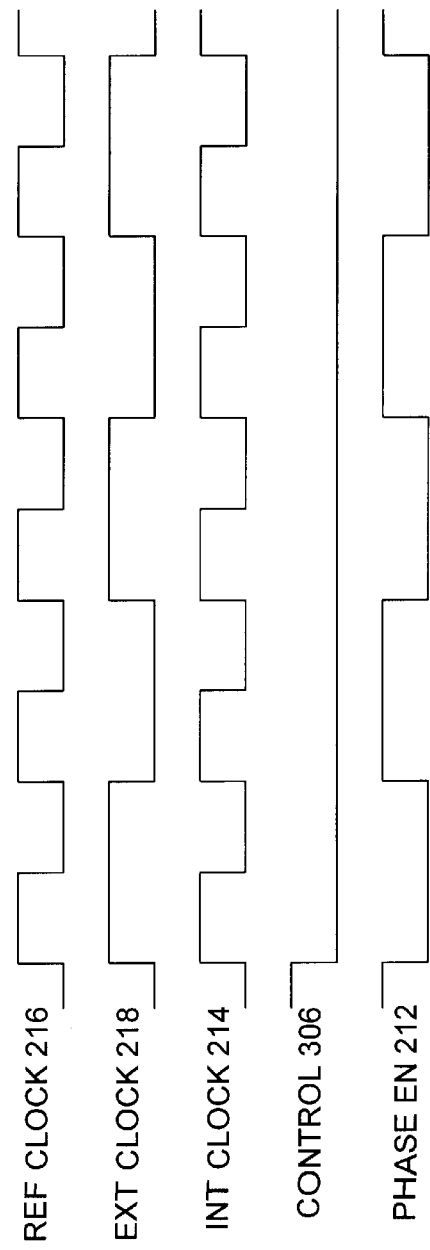

FREQUENCY COMPARISON AND GENERATION IN AN INTEGRATED PROCESSOR

BACKGROUND OF THE INVENTION

1. Field of the Invention

This invention relates to integrated processors and more particularly to the generation of multiple clock frequencies within an integrated processor.

2. Description of the Relevant Art

Microprocessor and computer designers strive to reduce size, cost and power consumption of computer systems while increasing the speed of computer systems. One way to achieve these diverse goals is to increase the integration of circuitry on one monolithic chip. In recent years, integrated processors have been developed to replace previously discrete microprocessors and associated peripheral devices within computer systems. An integrated processor is an integrated circuit that integrates the functions of both a microprocessor and various peripheral devices such as, for example, a memory controller, a DMA controller, a timer and a bus interface unit on a single monolithic chip. The introduction of integrated processors has allowed for decreases in the overall cost, size, and power consumption of computer systems and has in many cases accommodated improved performance characteristics of the computer system.

One disadvantage of integrated processors is the limited number of external pins available for inputting or outputting data to/from the integrated processor. Accordingly, a design goal of integrated processor designers is to reduce the number of external pins required to perform the functions of the integrated processor.

In one particular integrated processor, a microprocessor core is integrated with a peripheral bus interface circuit. The peripheral bus interface circuit interconnects with a peripheral bus external to the integrated processor that may operate at two or more frequencies. The integrated processor receives two clock input signals from an external clock generation circuit: a reference clock signal and an external clock signal. The reference clock signal is a constant frequency signal used to generate an internal clock signal for the internal bus interface circuit. The external clock interface signal provides a clock signal to the peripheral bus and may operate at a plurality of frequencies. The frequency of the internal clock signal is proportional to the frequency of the external clock signal and typically is a multiple of the external clock signal frequency. Accordingly, the internal clock frequency is adjusted when the external clock frequency is adjusted. In conventional integrated processors, an input signal to the integrated processor indicates the frequency at which the internal clock signal must operate to be compatible with the external clock signal. Unfortunately, the control signal to indicate the appropriate frequency of the internal clock signal requires the use of an external pin. As discussed above, it is a design goal of the integrated processor designer to minimize the number of signals received on external pins.

SUMMARY OF THE INVENTION

The problems outlined above are in large part solved by an integrated processor with a frequency comparator and generator in accordance with the present invention. In one embodiment, an integrated processor receives a reference clock signal and an external clock signal. A frequency comparator circuit compares the two clock signals and outputs a control signal indicative of the relative frequency of the signals without receiving an external control signal. In one particular embodiment, the frequency comparator circuit outputs a signal indicative of whether the two input signals are the same frequency or a different frequency. The control signal is input to a clock generation circuit, such as phase-locked loop. The clock generation circuit additionally receives the reference clock signal and outputs an internal clock signal with a frequency proportional to the reference clock signal. The frequency of the internal clock signal is determined by the control signal from the frequency comparator. In one particular embodiment, the clock generation circuit outputs an internal clock signal with a frequency twice the frequency of the reference clock signal if the frequency of the reference clock signal and the external clock signal are substantially equal. Alternatively, the clock generation circuit outputs an internal clock signal at the same frequency as the reference clock if the frequency of the reference clock signal and the external clock signal are not substantially equal.

Broadly speaking, the present invention contemplates an integrated processor configured to receive a reference clock signal and an external clock signal. The integrated processor includes a processor core, a peripheral bus interface coupled to the processor core, and a clock circuit coupled to the processor core and the peripheral bus interface. The clock circuit is configured to compare a frequency of the reference clock signal to a frequency of the external clock signal and to output an internal clock signal with a frequency equal to the frequency of the reference clock signal or a multiple of the frequency of the reference clock signal in dependence upon the comparison of the reference clock signal to the external clock signal.

The present invention further contemplates a clock circuit including a clock generator, a phase detector, and a clock multiplier circuit. The clock generator is configured to output an external clock signal and a reference clock signal. The phase detector circuit is coupled to the external clock signal and the reference clock signal and configured to output a control signal indicative of a frequency relationship between the external clock signal and the reference clock signal. The clock multiplier circuit is coupled to the reference clock signal and the control signal, and outputs an internal clock signal with a frequency determined by the control signal.

The present invention still further contemplates a computer system including an integrated processor coupled a clock generator circuit, a peripheral bus coupled to the integrated processor, and a peripheral device coupled to the peripheral bus. The integrated processor is configured to receive a reference clock signal and an external clock signal from the clock generation circuit and includes a processor core, a peripheral bus interface coupled to the processor core, and a clock circuit coupled to the processor core and the peripheral bus interface. The clock circuit is configured to compare a frequency of the reference clock signal to a frequency of the external clock signal and to output an internal clock signal with a frequency equal to the frequency of the reference clock signal or a multiple of the frequency of the reference clock signal in dependence upon the comparison of the reference clock signal to the external clock signal.

BRIEF DESCRIPTION OF THE DRAWINGS

Other objects and advantages of the invention will become apparent upon reading the following detailed description and upon reference to the accompanying drawings in which:

FIG. 7 is a timing diagram illustrating the timing characteristics of the clock signals of an integrated processor according to one embodiment of the present invention;

FIG. 8 is a timing diagram illustrating the timing characteristics of the clock signals of an integrated processor according to an alternative embodiment of the present invention.

Figure 1:
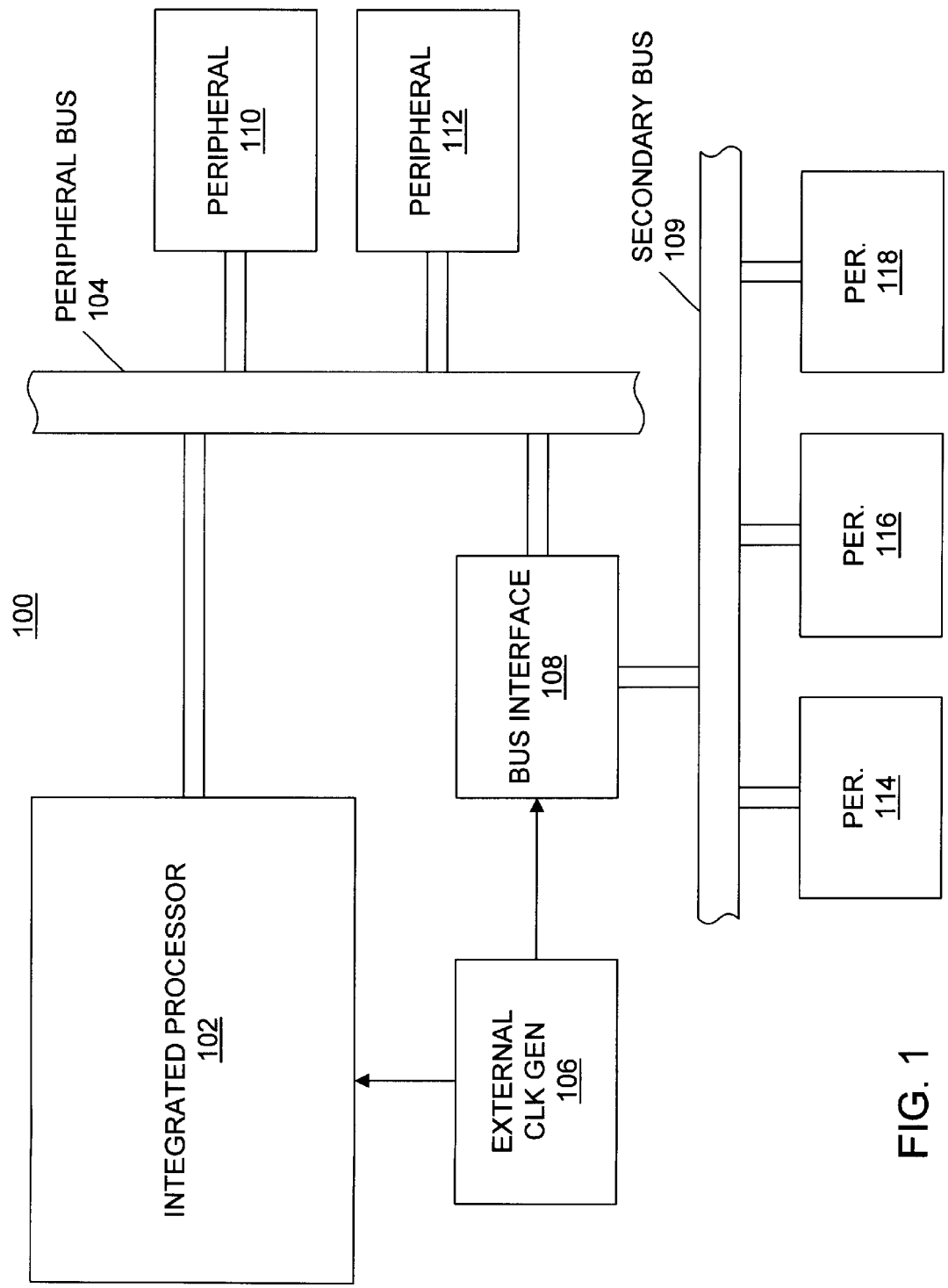
FIG. 1 is a block diagram of a computer system including an integrated processor according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a computer system including an integrated processor is shown. Computer system 100 includes integrated processor 102, peripheral bus 104, external clock generator 106, bus bridge 108, and peripheral devices 110 through 118. Integrated processor 102 receives a clock signal input from external clock generator 106. Integrated processor 102 is additionally coupled to peripheral bus 104. Peripheral bus 104 is a data communication bus for transferring data between integrated processor 102 and one or more peripheral devices. The present invention contemplates any conventional peripheral bus. For example, peripheral bus 104 may be a peripheral component interconnect (PCI) bus, an industry standard architecture (ISA) bus or an extended industry standard architecture (EISA) bus.

External clock generator 106 generates one or more clock signals provided to integrated processor 102 and bus bridge 108. External clock generator 106 generates clock signals used by portions of computer system 100 for synchronization and timing. External clock generator 106 may provide different clock signals to different portions of computer system 100. For example, external clock generator 106 may provide a CPU clock signal to integrated processor 102 at a different frequency than a peripheral bus clock signal. Portions of computer systems 100 may additionally include circuits for multiplying or dividing the frequency of the clock signal generated by external clock generator 106. For example, integrated processor 102 may include an internal clock generator circuit for multiplying the frequency of a clock signal received from external clock generator 106. The present invention contemplates any conventional clock generator.

Peripheral bus 104 is coupled to integrated processor 102, bus bridge 108 and peripherals 110 and 112. As noted above, peripheral bus 104 is a data communication bus coupled between integrated processor 102 and the peripherals of computer system 100. Peripherals 110 and 112 transmit and receive data to and from integrated processor 102 via peripheral bus 104. Peripherals 110 and 112 may be any of a variety of devices, such as disk drives, local area networks interfaces, audio/video devices, etc.

Peripheral bus 104 is additionally coupled to bus bridge 108. Bus bridge 108 provides an interface between peripheral bus 104 and a secondary data communication bus 109. In the illustrated embodiment, peripherals 114 through 118 are coupled to secondary data bus 109. Bus bridge 108 allows peripheral bus 104 to be extended to devices not directly compatible with peripheral bus 104. For example, peripheral bus 104 may operate at a higher data rate than secondary bus 109. Accordingly, peripheral devices capable of operating at a higher data rate may be coupled directly to peripheral bus 104 while devices not capable of operating at the higher data rate may be coupled to secondary bus 109. Data is transferred from the lower data rate peripherals, such as peripheral 114, to the bus bridge, which transfers the data to integrated processor 102 at the higher data rate of peripheral bus 104.

Figure 2:
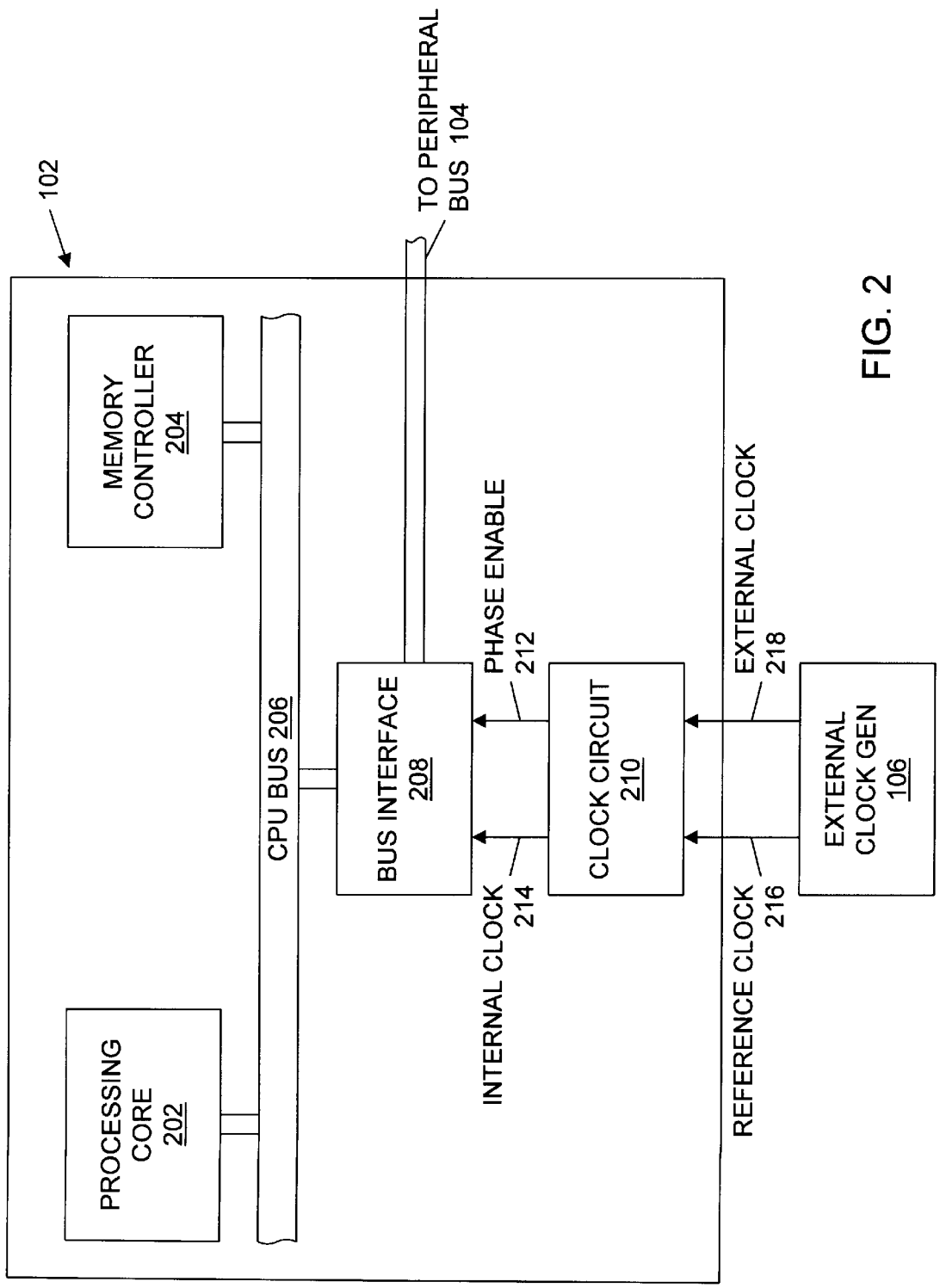
FIG. 2 is a block diagram further highlighting the interconnection of an integrated processor and an external clock generation circuit according to one embodiment of the present invention.

Turning now to FIG. 2, a block diagram further highlighting the interconnection between integrated processor 102 and external clock generator 106 is shown. In the illustrated embodiment, integrated processor 102 includes processing core 202, memory controller 204, CPU bus 206, bus interface 208, and clock circuit 210. Processor core 202, memory controller 204 and bus interface 208 are coupled to CPU bus 206. Bus interface 208 interfaces to peripheral bus 104. Clock circuit 210 interfaces to bus bridge 208. Clock circuit 210 is configured to receive a reference clock signal 216 and an external clock signal 218 from external clock generator 106. Clock circuit 210 outputs an internal clock signal 214 and a phase enable signal 212.

In the illustrated embodiment, CPU bus 206 interconnects processor core 202, memory controller 204 and bus interface 208. These functional block are included for illustrative purposes only. Integrated processor 202 may include additional functional blocks. For example, integrated processor 102 may additionally include a DMA controller, a timer, and other conventional functional blocks of an integrated processor.

In one particular embodiment, peripheral bus 104 is a PCI bus operating at one of two different frequency ranges. In one frequency range, peripheral bus 104 operates at 20 MHz to 33 MHz. In another frequency range, peripheral bus 104 operates at 40 MHz to 66 MHz. In the embodiment in which peripheral bus 104 is a PCI bus operating at the 40 MHz to 66 MHz frequency range, secondary bus 109 may be a PCI bus operating at the 20 MHz to 33 MHz frequency range. In this particular embodiment, peripheral bus 104 may interface to devices capable of operating at the higher frequency range and devices not capable of operating at the higher frequency range. Lower frequency devices are coupled to peripheral bus 104 through bus bridge 108. Higher frequency devices are coupled directly to peripheral bus 104.

Bus interface 208 is coupled to peripheral bus 104. As discussed above, peripheral bus 104 may operate at one of two frequency ranges. For the purposes of the discussion below, the first frequency range (20 to 33 MHz) will be referred to as 33 MHz, the second frequency range (40 to 66 MHz) will be referred to as 66 MHz. In one embodiment, bus interface 208 operates at twice the frequency of peripheral bus 104. Accordingly, if peripheral bus 104 is operating at 33 MHz, bus interface 208 operates at 66 MHz. Alternatively, if peripheral bus 104 is operating at 66 MHz, then bus interface 208 operates at 132 MHz.

Clock circuit 210 receives a reference clock signal 216 and an external clock signal 218. Clock circuit 210 generates the timing signals for the functional blocks within integrated processor 102. In the illustrated embodiment, clock circuit 210 generates an internal clock signal 214 and a phase enable signal 212 from reference clock signal 216 and external clock signal 218. In one embodiment, internal clock signal 214 is a clock signal with a frequency twice the frequency of external clock signal 218 and synchronized with external clock signal 218. Phase enable signal 212 is a clock signal that indicates the phase of the external clock signal. In one particular embodiment, phase enable signal 212 is signal that occurs on the rising edge of internal clock signal 214 immediately prior to a rising edge of external clock signal 218. The phase enable signal is discussed in more detail below with reference to FIGS. 4, 7 and 8.

Figure 3:
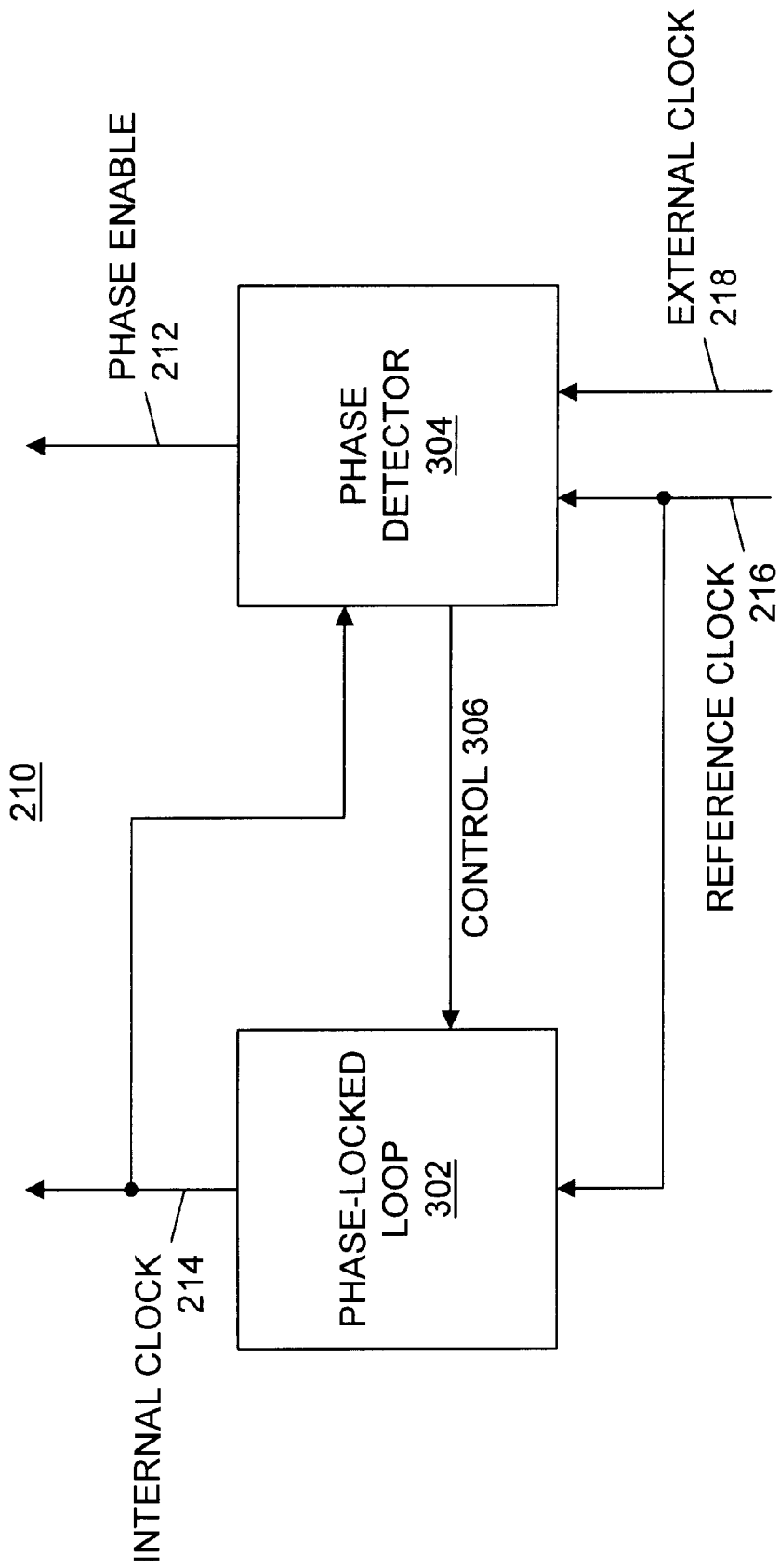
FIG. 3 is a block diagram of a clock generation circuit of an integrated processor according to one embodiment of the present invention.

Turning now to FIG. 3, a block diagram of clock circuit 210 according to one embodiment of the present invention is shown. In the illustrated embodiment, clock circuit 210 includes a phase-locked loop 302 and a phase detector 304. Phase detector 304 is coupled to receive reference clock signal 216 and external clock signal 218. Phase detector 304 compares the frequency of reference clock signal 216 to the frequency of external clock signal 218. Phase detector 304 outputs a control signal 306 that is indicative of the frequency relationship between reference clock signal 216 and external clock signal 218. In one particular embodiment, reference clock signal 216 is a 66 MHz signal and external clock signal 218 is either a 33 MHz signal or 66 MHz signal. In this embodiment, phase detector 304 compares reference clock signal 216 to external clock signal 218 to determine whether the clock signals are the same frequency (the same frequency may be the exact same frequency or a frequency within a predefined tolerance). If external clock signal 218 is a 33 MHz signal, control signal 306 will indicate that the signals are a different frequency. Alternatively, if external clock 218 is a 66 MHz signal, control signal 306 will indicate that the signals are the same frequency.

Phase-locked loop 302 receives reference clock signal 216 and control signal 306. In one embodiment, based upon the state of control signal 306, phase-locked loop 302 outputs an internal clock signal 214 that is either the same frequency as reference clock signal 216 or twice the frequency of reference clock signal 216. Although a phase-locked loop is illustrated in FIG. 3, the present invention contemplates any conventional circuit for generating a clock signal that is a multiple or a fraction of the frequency of an input signal. Phase-locked loop 302 is discussed in more detail below with reference to FIG. 5.

Internal clock signal 214 provides a timing signal to bus interface 208. Internal clock signal 214 is additionally provided to phase detector 304. Based on internal clock signal 214 and external clock signal 218, phase detector 304 generates phase enable signal 212. Phase enable signal 212 indicates the phase of external clock signal 218 relative to internal clock signal 214. In one embodiment, phase enable signal 212 is a signal asserted at each rising edge of internal clock signal 214 immediately prior to a rising edge of external clock signal 218. Phase enable signal 212 indicates that data will be valid on the subsequent rising edge of external clock signal 218. Phase enable signal 212 is illustrated in FIGS. 7 and 8.

Figure 4:
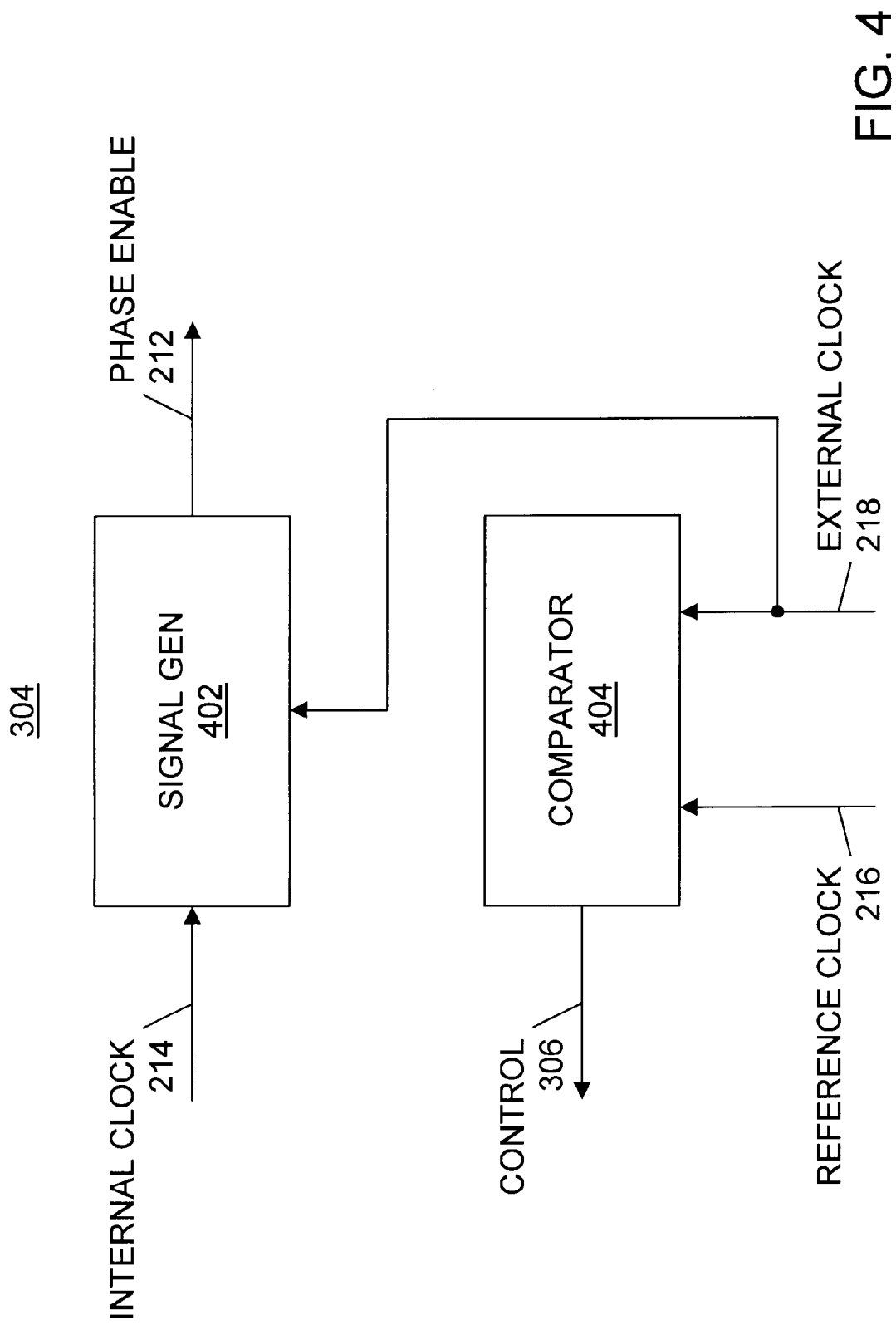
FIG. 4 is a block diagram of a phase detector according to one embodiment of the present invention.

Turning now to FIG. 4, a block diagram of phase detector 304 according to one embodiment of the present invention is shown. In the illustrated embodiment, phase detector 304 includes a signal generator 402 and a comparator 404. Comparator 404 receives reference clock signal 216 and external clock signal 218. Comparator 404 compares the frequencies of the two input signals and outputs control signal 306. Control signal 306 indicates the relative frequencies of the two input signals. In one embodiment, reference clock signal 216 is a 66 MHz signal and external clock signal 218 is either a 33 MHz or a 66 MHz signal. In this embodiment, comparator 404 determines if the frequencies of the two clock signals are within a predefined tolerance. If the two clock signals are within a predefined tolerance, control signal 306 is asserted. The assertion of control signal 306 indicates the two input signals have substantially the same frequency. Alternatively, if the frequencies of the two input signals are not within a predefined tolerance (e.g., reference clock signal 216 is 66 MHz and external clock signal 218 is 33 MHz), control signal 306 is deasserted. The term "asserted" as used herein may indicate either positive logic in which asserted is a logical high or a logical one, or negative logic in which asserted is a logical low or logical zero.

Signal generator 402 receives internal clock signal 214 and external clock signal 218, and outputs phase enable signal 212. As discussed above, phase enable signal 212 indicates the phase of external clock signal 218 relative to the internal clock signal. In one embodiment, internal clock signal 214 is twice the frequency of external clock signal 218 and synchronized with external clock signal 218. Accordingly, internal clock signal 214 has two rising edges for each rising edge of external clock signal 218. One rising edge occurs in phase with the rising edge of external clock signal 218 (i.e., the rising edges occur substantially at the same time), and the other rising edge occurs out of phase with external clock signal 218 (i.e., the rising edge of the internal clock signal occurs at substantially the same time as the falling edge of the external clock signal). It is advantageous for bus interface 208 to know whether a rising edge of internal clock signal 214 is in-phase or out-of-phase with external clock signal 218. Accordingly, phase detector 304 outputs phase enable signal 212 to indicate which rising edges of internal clock signal 214 are in-phase with the rising edges of external clock signal 218. In the illustrated embodiment, phase enable signal 212 is output by signal generator 402. Signal generator 402 outputs a signal on the rising edge of internal clock signal 214 that is out-of-phase with external clock signal 218. Bus interface circuit 208 may use phase enable signal 212 as an indication that the next rising edge of internal clock signal 214 will be in-phase with a rising edge of external clock signal 218.

Figure 5:
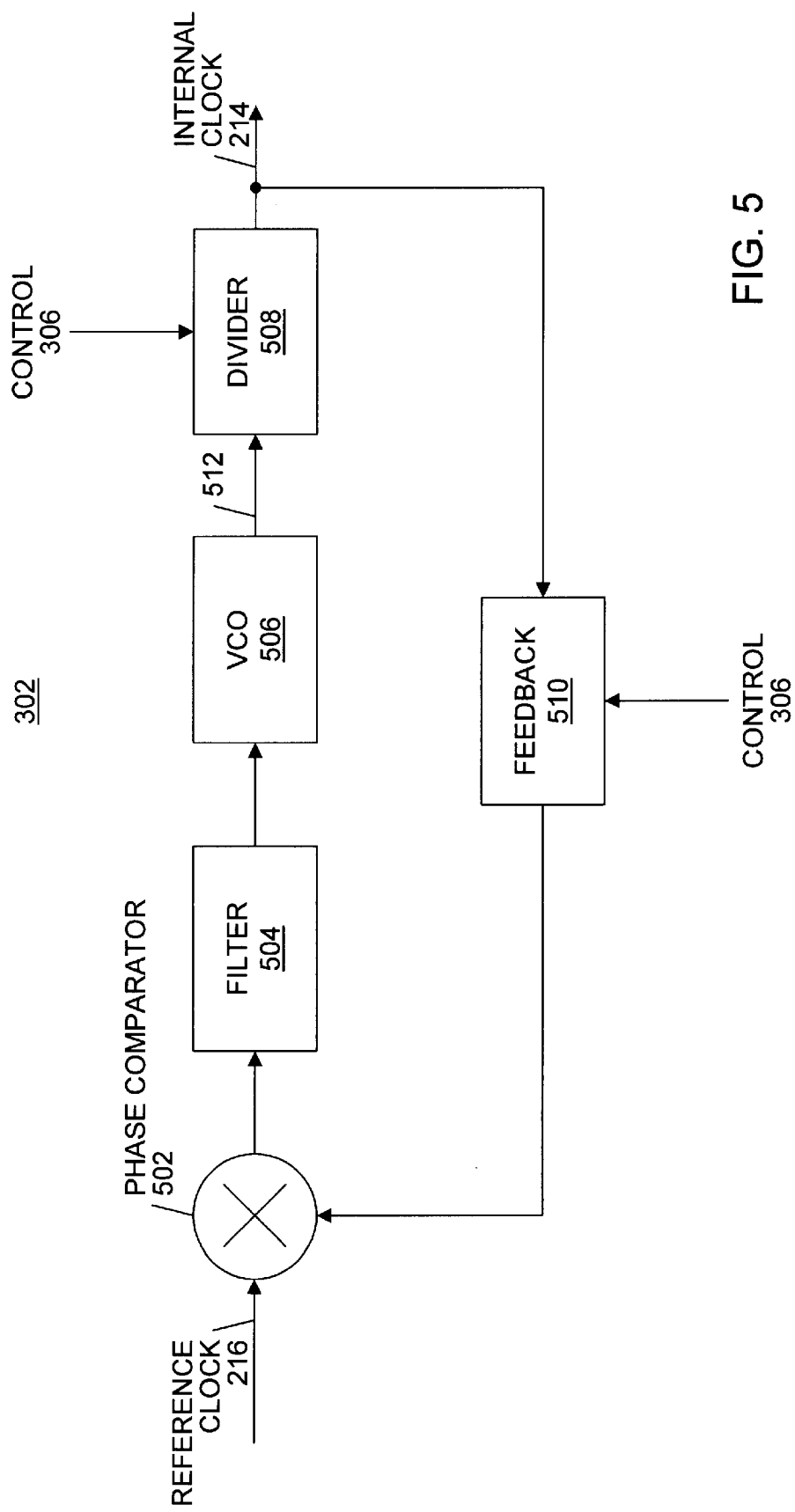
FIG. 5 is a block diagram of a phase-locked loop according to one embodiment of the present invention.

Turning now to FIG. 5, a block diagram of phase-locked loop 302 according to one embodiment of a present invention is shown. It should be noted that the phase-locked loop illustrated in FIG. 5 is for illustrative purposes only. The present invention contemplates any conventional phase-locked loop circuit capable of outputting a clock signal at two or more frequencies. In the illustrated embodiment, phase-locked loop 302 includes phase comparator 502, filter 504, voltage-controlled oscillator (VCO) 506, divider 508, and feedback circuit 510. In the illustrated embodiment, VCO 506 outputs a clock signal at twice the highest frequency desired for internal clock signal 214. For example, if the highest frequency desired for internal clock signal 214 is 132 MHz, the frequency of output signal 512 of VCO 506 is 264 MHz. Output signal 512 of VCO 506 is input to divider 508. Divider 508 also receives control signal 306 from phase detector 304. In one embodiment, divider 508 divides the frequency of output signal 512 by either two or four, depending upon the state of control signal 306. Divider 508 divides the frequency of the clock signal by two if control signal 306 is asserted and divides the clock frequency by four if control signal 306 is deasserted. In one particular embodiment, output signal 512 of VCO 506 has a frequency of 264 MHz. Accordingly, the output of divider 508 is 132 MHz or 66 MHz in dependence upon the state of control signal 306.

The output of divider 508 is provided to feedback circuit 510. Feedback circuit 510 divides the frequency of the signal and couples the divided frequency to phase comparator 502. In one embodiment, feedback circuit 5108 receives control signal 316 and divides the frequency of the signal by two if control signal 306 is asserted and does not divide the frequency of the signal if control signal 306 is deasserted.

Phase comparator 502 compares the divided feedback signal from feedback circuit 510 to reference clock signal 216. Phase comparator 502 outputs an error signal indicative of the frequency difference between the output of feedback circuit 510 and reference clock signal 216. If the frequencies are the same, phase comparator 502 outputs a null signal. Alternatively, if one frequency is greater than the other, phase comparator 502 outputs an error signal with a voltage proportional to the difference in frequency.

The error signal from phase comparator 502 is input as a filter 504. Filter 504 is typically a low-pass filter which limits the frequency at which the error signal can vary and insures the stability of the circuit. The filtered error signal from filter 504 is input to VCO 506, which adjusts the frequency of output 512 based upon the voltage of the error signal. If the frequency of the signal fed-back from VCO 506 is greater than the frequency of reference clock signal 516, the error signal will cause VCO 506 to decrease the frequency of output signal 512. Alternatively, if the frequency of the signal fed-back from VCO 506 is less than the frequency of reference clock signal 516, the error signal will cause VCO 506 to increase the frequency of output signal 512.

Figure 6:
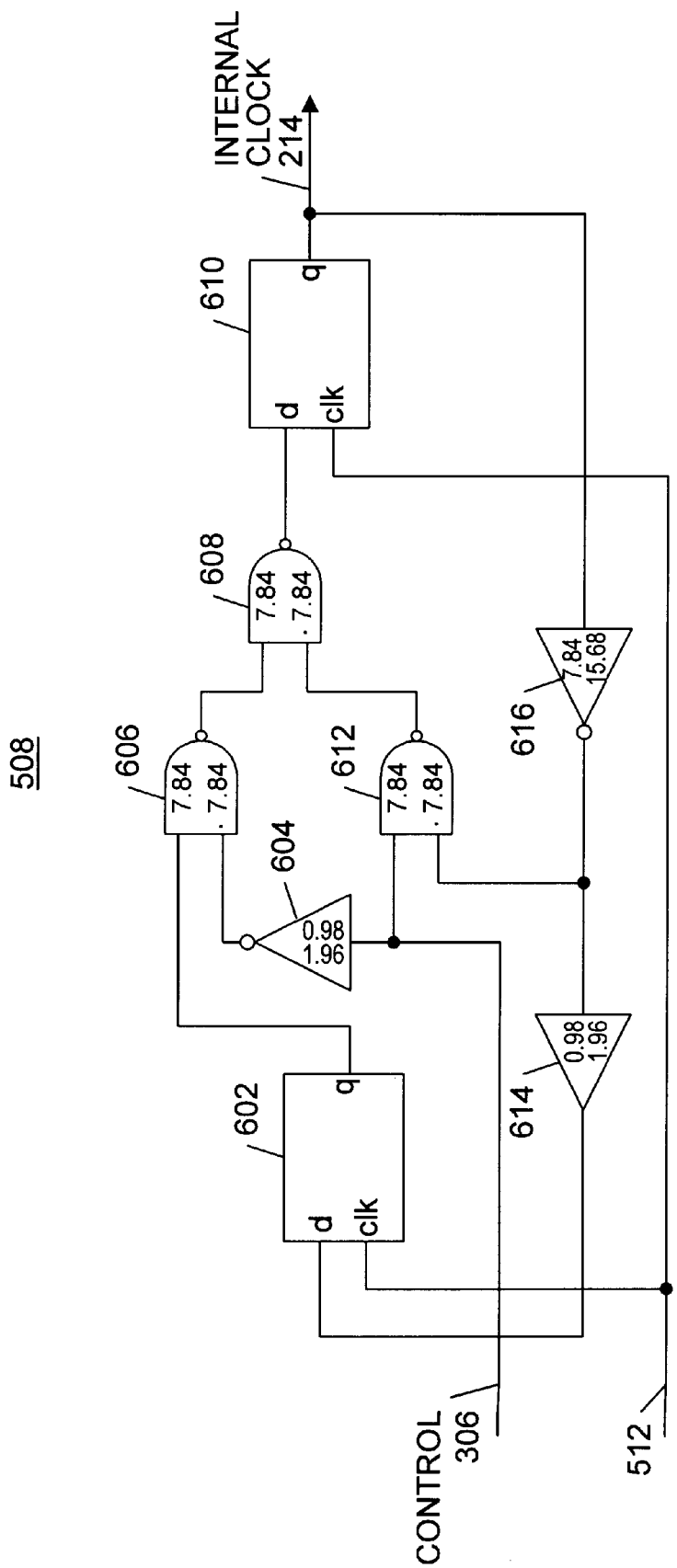
FIG. 6 is a block diagram of the divider circuit illustrated in FIG. 5 according to one embodiment of the present invention.

Turning now to FIG. 6, a block diagram of divider 508 is shown according to one embodiment of the present invention. Divider 508 includes flip-flops 602 and 610, NAND gates 606, 608 and 612, inverters 604 and 616, and buffer 614. In the illustrated embodiment, divider circuit 508 divides the frequency of output signal 512 by two or four in dependence upon the state of control signal 306. If control signal 306 is asserted, divider 508 divides the frequency by two. If control signal 306 is deasserted, divider 508 divides the frequency by four.

If control signal 306 is asserted (in this illustrated embodiment asserted is a logical one), the output of inverter 604 is deasserted, which asserts the output of NAND gate 606 regardless of the state of flip-flop 602. Because NAND gate 608 and 612 each have one input asserted, the NAND gates invert the remaining input. Accordingly, when control signal 306 is asserted, divider circuit 508 effectively reduces to flip-flop 610 with its output Q coupled to its input D through three inverting circuits (inverter 116, NAND gate 112, and NAND gate 608). Thus, flip-flop 610 divides the frequency of its clock input by two and outputs the signal as internal clock signal 214.

If control signal 306 is deasserted, the output of NAND gate 612 is asserted regardless of the output of inverter 616. NAND gates 606 and 608 act as inverters because each has one asserted input. Accordingly, divider 508 effectively reduces to the output Q of flip-flop 602 coupled to the input D of flip-flop 610 through two inverting circuits (NAND gates 606 and 608) and the Q output of flip-flop 610 is coupled to the D input of flip-flop 602 through inverter 616 and buffer 614. The two series connected flip-flops divide the frequency of input clock signal 512 by four and output the signal as internal clock signal 214.

Turning now to FIG. 7, a timing diagram illustrating the timing relationship between reference clock signal 216, external clock signal 218, internal clock signal 214 and phase enable signal 212 is shown according to one embodiment of the present invention. In FIG. 7, the frequency of external clock signal 218 is the same frequency as reference clock signal 216. Accordingly, control signal 306 is asserted and phase-locked loop 302 outputs internal clock signal 214 at twice the frequency of reference clock signal 216. Phase enable 212 is asserted on a rising edge of internal clock signal 214 immediately prior to a rising edge of external clock signals 218. In other words, phase enable signal 212 is asserted on a rising edge of internal clock signal 214 out-of-phase with the rising edge of external clock 218.

Turning now to FIG. 8, the frequency of external clock signal 218 is half the frequency of reference clock signal 216. Accordingly, control signal 306 is deasserted and phase-locked loop 302 outputs internal clock signal 214 at the frequency of reference clock signal 216. In a manner similar to that discussed above with reference to FIG. 7, phase enable signal 212 is asserted on a rising edge of reference clock signal 214 immediately prior to a rising edge of external clock signal 218.

Numerous variations and modifications will become apparent to those skilled in the art once the above disclosure is fully appreciated. It is intended that the following claims be interpreted to embrace all such variations and modifications.

What is claimed is:

1. An integrated processor configured to receive a reference clock signal and an external clock signal and comprising:

a processor core;

a peripheral bus interface coupled to said processor core; and a clock circuit coupled to said processor core, wherein said processor core, peripheral bus interface, and clock circuit are formed on a single monolithic substrate;

wherein said clock circuit is configured to compare a frequency of said reference clock signal to a frequency of said external clock signal and to output an internal clock signal, wherein said clock circuit is configured to generate said internal clock signal with a frequency equal to said frequency of said reference clock signal in response to detecting a first frequency relationship between said reference clock signal and said external clock signal, and wherein said clock circuit is configured to generate said internal clock signal with a frequency which is a multiple of said frequency of said reference clock signal in response to detecting a second frequency relationship between said reference clock signal and said external clock signal, wherein said multiple is not equal to one;

wherein said clock circuit comprises a comparator circuit that compares said frequency of said reference clock signal to said frequency of said external clock signal and outputs a control signal indicative of whether said frequency of said reference clock signal equals said frequency of said external clock signal; and a phase-locked loop configured to receive said control signal of said comparator circuit and said reference clock signal and configured to output said internal clock signal.

2. The integrated processor of claim 1 wherein said multiple of said frequency of said reference clock signal is twice said frequency of said reference clock signal.

3. The integrated processor of claim 2 wherein said frequency of said internal clock signal is twice said frequency of said reference clock signal in response to said comparison detecting said frequency of said reference clock signal equals said frequency of said external clock signal.

4. The integrated processor of claim 2 wherein said frequency of said internal clock signal is equal to said frequency of said reference clock signal in response to said comparison detecting said frequency of said reference clock signal is twice said frequency of said external clock signal.

5. The integrated processor of claim 1 wherein said clock circuit is coupled to said peripheral bus interface and said internal clock signal provides a timing signal to said peripheral bus interface.

6. The integrated processor of claim 1 wherein said phase-locked loop comprises:
   a phase comparator configured to receive said reference clock signal and a feedback signal, and configured to output an error signal indicative of a phase relationship between said reference clock signal and said feedback signal;
   a low-pass filter configured to receive said error signal of said phase comparator;
   a voltage controlled oscillator configured to receive an output of said low-pass filter and output an oscillator signal;
   a clock divider circuit configured to receive said oscillator signal and said control signal and output said internal clock signal, wherein a number by which said frequency of said clock signal is divided is determined by said control signal; and
   a feedback circuit coupled to receive said internal clock signal and output said feedback signal.

7. The integrated processor of claim 1 wherein said peripheral bus interface interfaces said processor core to a peripheral component interface (PCI) bus.

8. The integrated processor of claim 1 wherein said clock circuit further outputs a processor clock to said processor core.

9. A clock circuit comprising:
   a clock generator configured to output an external clock signal and a reference clock signal;
   a phase detector circuit coupled to said external clock signal, an internal clock signal and said reference clock signal and configured to output a control signal and a phase enable signal, wherein said control signal is indicative of a frequency relationship between said external clock signal and said reference clock signal, and wherein said phase enable signal is indicative of a phase relationship between said external clock signal and said internal clock signal;
   a clock multiplier circuit coupled to said reference clock signal and said control signal, wherein said clock multiplier circuit outputs said internal clock signal with a frequency determined by said control signal, wherein said frequency of said internal clock signal is equal to the frequency of said reference clock signal upon detecting a first condition of said control signal, and wherein said frequency of said internal clock signal is a multiple of said frequency of said reference clock signal upon detecting a second condition of said control signal, wherein said multiple is not equal to one.

10. The clock circuit of claim 9 wherein said clock multiplier circuit is a phase-locked loop.

11. The clock circuit of claim 9 wherein said frequency of said internal clock signal is twice said frequency of said reference clock signal if said frequency of said reference clock signal equals said frequency of said external clock signal.

12. The clock circuit of claim 9 wherein said frequency of said internal clock signal is equal to said frequency of said reference clock signal if said frequency of said reference clock signal is twice said frequency of said external clock signal.

13. The clock circuit of claim 10 wherein said phase-locked loop comprises:
   a phase comparator configured to receive said reference clock signal and a feedback signal, and configured to output an error signal indicative of a phase relationship between said reference clock signal and said feed-back signal;
   a low-pass filter configured to receive said error signal of said phase comparator;
   a voltage controlled oscillator configured to receive an output of said low-pass filter and output an oscillator signal;
   a clock divider circuit configured to receive said oscillator signal and said control signal and output said internal clock signal, wherein a number by which said frequency of said clock signal is divided is determined by said control signal; and
   a feedback circuit coupled to receive said internal clock signal and output said feedback signal.

14. A computer system comprising:
   an integrated processor coupled a clock generator circuit;
   a peripheral bus coupled to said integrated processor;
   a peripheral device coupled to said peripheral bus;
   wherein said integrated processor is configured to receive a reference clock signal and an external clock signal and includes: a processor core, a peripheral bus interface coupled to said processor core; and a clock circuit coupled to said processor core; wherein said processor core, peripheral bus interface, and clock circuit are formed on a single monolithic substrate;
   wherein said clock circuit is configured to compare a frequency of said reference clock signal to a frequency of said external clock signal and to output an internal clock signal, wherein said clock circuit is configured to generate said internal clock signal with a frequency equal to said frequency of said reference clock signal in response to detecting a first frequency relationship between said reference clock signal and said external clock signal, and wherein said clock circuit is configured to generate said internal clock signal with a frequency which is a multiple of said frequency of said reference clock signal in response to detecting a second frequency relationship between said reference clock signal and said external clock signal, wherein said multiple is not equal to one;
   wherein said clock circuit comprises a comparator circuit that compares said frequency of said reference clock signal to said frequency of said external clock signal and outputs a control signal indicative of whether said frequency of said reference clock signal equals said frequency of said external clock signal; and a phase-locked loop configured to receive said control signal of said comparator circuit and said reference clock signal and configured to output said internal clock signal.

15. The computer system of claim 14 wherein said multiple of said frequency of said reference clock signal is twice said frequency of said reference clock signal.

16. The computer system of claim 15 wherein said frequency of said internal clock signal is twice said frequency of said reference clock signal in response to said comparison detecting said frequency of said reference clock signal equals said frequency of said external clock signal.

17. The computer system of claim 15 wherein said frequency of said internal clock signal is equal to said frequency of said reference clock signal in response to said comparison detecting said frequency of said reference clock signal is twice said frequency of said external clock signal.

18. The computer system of claim 14 wherein said clock circuit is coupled to said peripheral bus interface and said internal clock signal provides a timing signal to said peripheral bus interface.

19. The computer system of claim 14 wherein said phase-locked loop comprises:

a phase comparator configured to receive said reference clock signal and a feedback signal, and configured to output an error signal indicative of a phase relationship between said reference clock signal and said feedback signal;

a low-pass filter configured to receive said error signal of said phase comparator;

a voltage controlled oscillator configured to receive an output of said low-pass filter and output an oscillator signal;

a clock divider circuit configured to receive said oscillator signal and said control signal and output said internal clock signal, wherein a number by which said frequency of said clock signal is divided is determined by said control signal; and a feedback circuit coupled to receive said internal clock signal and output said feedback signal.

* * * * *